United States Patent
Lee

(10) Patent No.: US 8,162,270 B2
(45) Date of Patent: Apr. 24, 2012

(54) TELESCOPIC TUBE LOCKING STRUCTURE

(75) Inventor: Lihwa Lee, Foshan (CN)

(73) Assignee: Foshan Nanhai Chevan Optical Electronics Co., Ltd., Foshan, Guangdong (CN)

( * ) Notice: Subject to any disclaimer, the term of this patent is extended or adjusted under 35 U.S.C. 154(b) by 0 days.

(21) Appl. No.: 13/009,224

(22) Filed: Jan. 19, 2011

(65) Prior Publication Data

US 2012/0068026 A1    Mar. 22, 2012

(30) Foreign Application Priority Data

Sep. 21, 2010    (CN) .................. 2010 2 0538358 U

(51) Int. Cl.
*F16M 11/00*    (2006.01)
*F16B 7/04*    (2006.01)

(52) U.S. Cl. ......... 248/157; 248/159; 248/411; 403/350

(58) Field of Classification Search ................. 248/157, 248/159, 411, 161, 412; 403/350, 109.5, 403/110, 351; 74/531, 567

See application file for complete search history.

(56) References Cited

U.S. PATENT DOCUMENTS

| | | | | |
|---|---|---|---|---|
| 2,432,059 A * | 12/1947 | Zipser | ........................... | 403/350 |
| 3,515,418 A * | 6/1970 | Nielsen, Jr | ................. | 403/109.5 |
| 4,076,437 A * | 2/1978 | Mazzolla | ...................... | 403/350 |
| 4,419,026 A * | 12/1983 | Leto | ............................... | 403/104 |
| 4,632,597 A * | 12/1986 | Clausen et al. | ............... | 403/351 |
| 4,906,124 A * | 3/1990 | Hogue | .......................... | 403/352 |
| 5,011,319 A * | 4/1991 | Levi et al. | .................. | 403/109.5 |
| 6,604,886 B2 * | 8/2003 | Kinzler et al. | ................ | 403/370 |

* cited by examiner

*Primary Examiner* — Anita M King
(74) *Attorney, Agent, or Firm* — Ryan A. Schneider, Esq.; Troutman Sanders LLP

(57) ABSTRACT

A telescopic tube locking structure includes a telescopic tube including at least a upper tubular part and a lower tubular part; an eccentric camshaft having a lower portion fixed in the lower tubular part and a upper portion being inserted into the upper tubular part, and, an opening cam having a larger diameter than the upper portion of the eccentric camshaft is rotationally mounted on the eccentric shaft and is inserted in and engaged with the upper tubular part in a rotationally fixed manner such that the opening cam is axially movable along with the an eccentric camshaft in the upper tubular part and is rotationally fixed with the upper tubular part; wherein a central line of the opening cam is offset from a central line of the upper portion of the eccentric camshaft.

17 Claims, 3 Drawing Sheets

TELESCOPIC TUBE LOCKING STRUCTURE

CROSS-REFERENCE TO RELATED APPLICATIONS

This application claims the benefit of CN Utility Model Application No. 201020538358.7, filed 21 Sep. 2010.

BACKGROUND OF THE INVENTION

1. Field of the Invention

The invention relates to tripod and monopod for supporting photographing devices, and particularly relates to locking structure of tripods or monopods.

2. Description of Related Art

In the existing products of photographing accessories, the pin pads of a tripod is locked and loosened by a wrenching or locking structures, the wrenching structure has relatively large profile dimension, and the locking structure needs high cost; the large profile dimension affects the weight of the whole product, and the selling price is likely to be high due to high cost; and what photographers need are high-quality and low-cost products with light weight and reasonable price.

BRIEF SUMMARY OF THE INVENTION

The invention aims at solving the problems in the prior art and providing a telescopic tube locking structure with simple structure and convenient as well as quick operation.

The invention adopts the following technical scheme: a telescopic tube locking structure comprises t least a upper tubular part and a lower tubular part; an eccentric camshaft having a lower portion fixed in the lower tubular part and a upper portion being inserted into the upper tubular part; an opening cam having a larger diameter than the upper portion of the eccentric camshaft and is rotationally mounted on the eccentric camshaft and is inserted in and engaged with the upper tubular part in a rotationally fixed manner such that the opening cam is axially movable along with the eccentric camshaft in the upper tubular part and is rotationally fixed with the upper tubular part; wherein a central line of the opening cam is offset from a central line of the upper portion of the eccentric camshaft.

Preferably, the rotationally fixed manner is achieved by providing at least one convex rib capable of preventing the opening camshaft from rotating axially is arranged on the internal wall of the upper tubular part of the telescopic tube; and Preferably, the eccentric camshaft is provided with a cylindrical body, the upper portion of the cylindrical body is sunken inwards to form a cylindrical neck portion, and the central line of the neck portion is not overlapped with that of the cylindrical body;

the opening cam is provided with a hollow cylindrical body, a notch matched with the neck portion of the eccentric camshaft is arranged on the hollow cylindrical body, the opening cam is buckled with the eccentric camshaft through the notch, the central line of the opening cam is offset, i.e. not overlapped with that of the cylindrical body of the eccentric camshaft, and a clamping groove matched with the convex rib is arranged on the external wall of the opening cam.

The telescopic tube locking structure further comprises a lock ring, wherein the upper portion of the lock ring is connected with the upper tubular part of the telescopic tube, the lower portion of the lock ring is gathered inwards to form a gathering part jointed with the external wall of the lower tubular part of the telescopic tube, and the external diameter of the eccentric camshaft is larger than that of the lower tubular part of the telescopic tube.

Preferably, the upper portion of the lock ring and the upper tubular part of the telescopic tube are in threaded connection.

The locking structure further comprises a barrier sheet installed in the upper tubular part of the telescopic tube, wherein the barrier sheet comprises two opposite half-round sheet bodies, the lower portion of each half-round sheet body is extended outwards to form a convex edge, the external wall of the upper portion of each half-round sheet body is jointed with the internal wall of the upper tubular part of the telescopic tube, the internal wall of each half-round sheet body is jointed with the external wall of the lower tubular part of the telescopic tube, and the upper end face of the convex edge is jointed with the lower end face of the upper tubular part.

The invention has the beneficial effects of simple structure, convenient use and good locking effect.

These and other objects, features and advantages of the present invention will become more apparent upon reading the following specification in conjunction with the accompanying drawing figures.

DETAILED DESCRIPTION OF THE INVENTION

Figure 1:
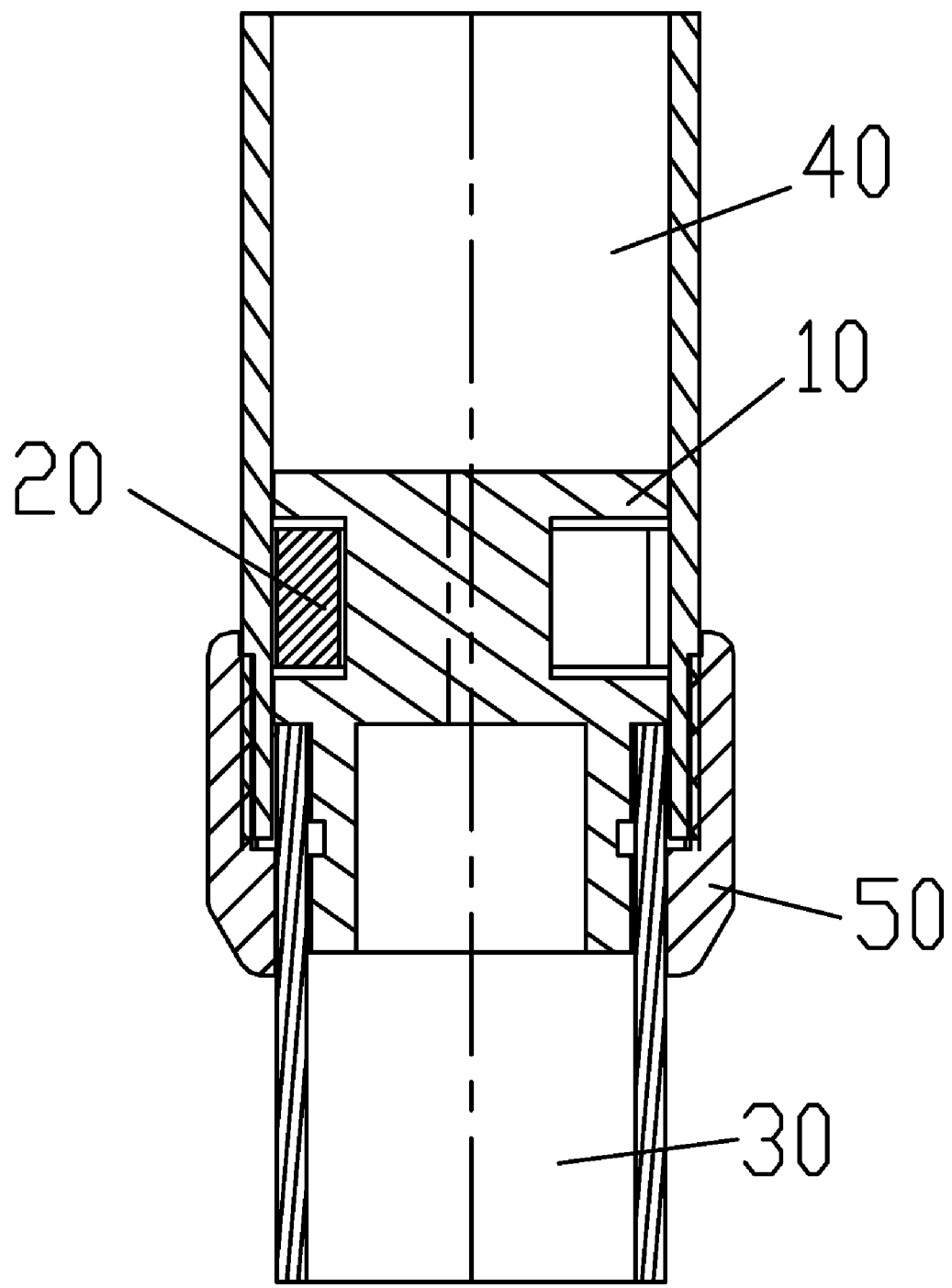
FIG. 1 is a longitudinal sectional view of the telescopic tube locking structure according to one embodiment of the invention.
Figure 2:
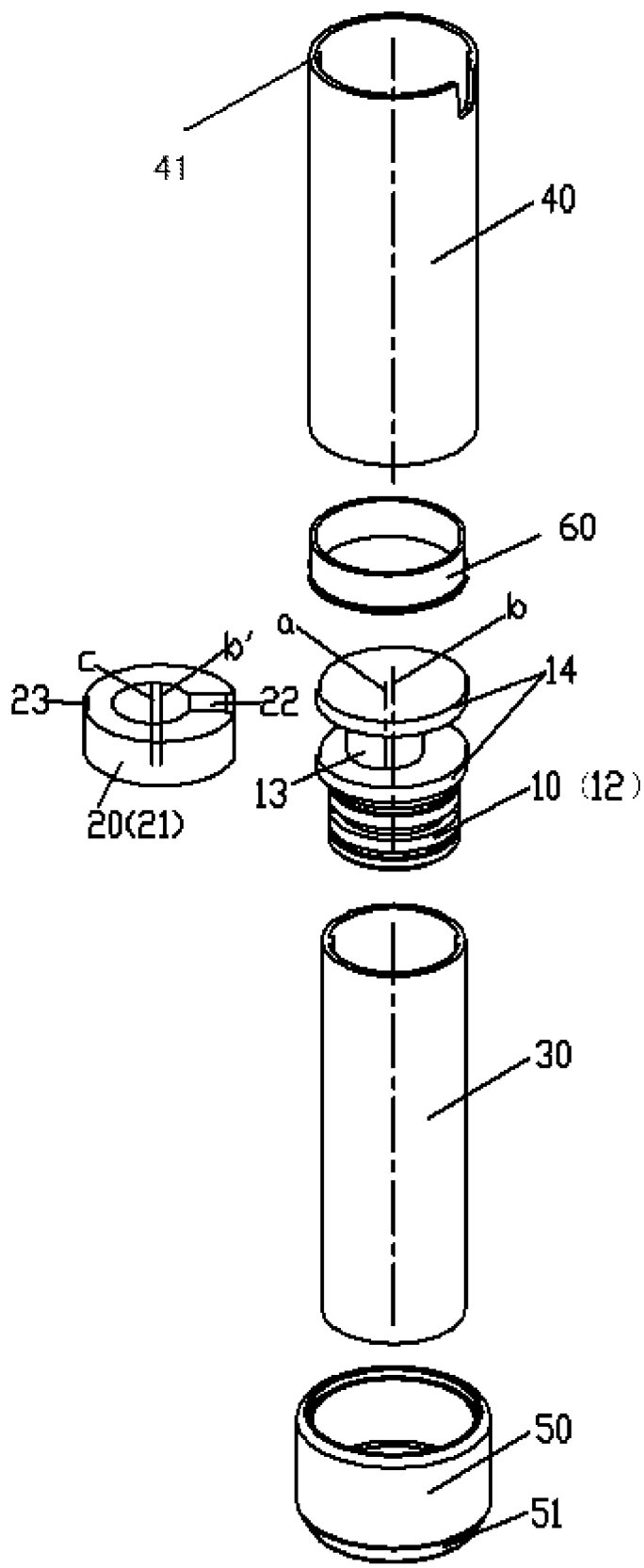
FIG. 2 is a structural exploded view of the telescopic tube locking structure according to one embodiment of the invention.

As shown in FIG. 1 and FIG. 2, the telescopic tube locking structure of the invention comprises an eccentric camshaft 10, an opening cam 20, an upper tubular part 40 and a lower tubular part 30; the upper end of the lower tubular part 30 is inserted in the lower end of the upper tubular part 40, the lower portion of the eccentric camshaft 10 is connected with the lower tubular part 30 of the telescopic tube, the upper portion of the eccentric camshaft and the opening cam 20 are inserted in the upper tubular part 40 of the telescopic tube, and at least one longitudinal convex rib 41 capable of preventing the opening camshaft from rotating axially is arranged on the internal wall of the upper tubular part of the telescopic tube;

The eccentric camshaft 10 is provided with a cylindrical body 12, the upper portion of the cylindrical body is sunken inwards to form a cylindrical neck portion 13, and the central line a of the neck portion 13 is not overlapped with the central line b of the cylindrical body;

The opening cam 20 is provided with a hollow cylindrical body 21, wherein a notch 22 matched with the neck portion 13 of the eccentric camshaft is arranged on the hollow cylindrical body, the opening cam 20 is buckled with the eccentric camshaft 10 through the notch 22, the central line c of the opening cam 20 is not overlapped with the central line b' of the cylindrical body of the eccentric camshaft, and a longitudinal clamping groove 23 matched with the convex rib is arranged on a external wall of the opening cam.

Preferably, an end cap 14 is respectively arranged at the upper and lower ends of the neck portion of the eccentric camshaft 10, and the diameter of the end cap is larger than that of the cylindrical body of the eccentric camshaft.

The telescopic tube locking structure further comprises a lock ring 50 having an upper portion connected with the upper tubular part telescopic tube, and a lower portion gathered inwards to form a gathering part 51 jointed with the external wall of the lower tubular part telescopic tube.

Figure 3:
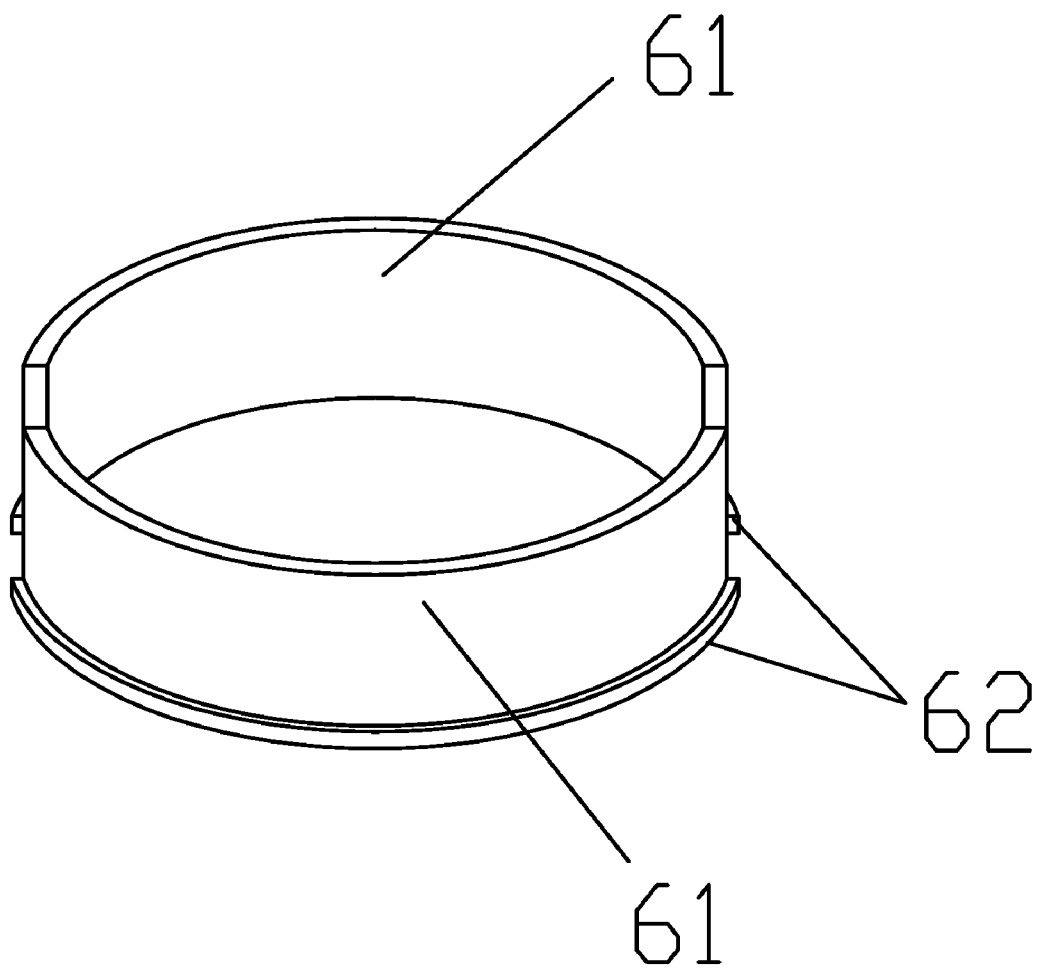
FIG. 3 is a structural diagram of the barrier sheet.

As shown in FIG. 3, the locking structure further comprises a barrier sheet 60 installed in the upper tubular part of the telescopic tube, the barrier sheet comprises two opposite half-round sheet bodies 61, the lower portion of each half-round sheet body is extended outwards to form a convex edge 62, the external wall of the upper portion of each half-round sheet body is jointed with the internal wall of the upper tubular part of the telescopic tube, the internal wall of each half-round sheet body is jointed with the external wall of the lower tubular part of the telescopic tube, and the upper end face of the convex edge is jointed with the lower end face of the upper tubular part. The arrangement of the barrier sheet is to prevent separation of the upper tubular part and the lower tubular part and keep stability between the upper tubular part and the lower tubular part.

The assembling procedure of the telescopic tube locking structure according to the invention includes the following steps: firstly, assembling the opening cam and the eccentric camshaft, and clamping the opening cam on the neck portion of the eccentric camshaft; secondly, fixedly connecting the lower portion of the eccentric camshaft with the lower tubular part of the telescopic tube by adhesive, and inserting the opening cam and the upper portion of the eccentric camshaft into the upper tubular part of the telescopic tube so as to lead the clamping groove on the external wall of the opening cam to be clamped with the convex rib in the upper tubular part of the telescopic tube; thirdly, installing the barrier sheet in the tail end of the upper tubular part of the telescopic tube; and finally, sheathing the lock ring onto the tail end of the lower tubular part of the telescopic tube.

The using method of the telescopic tube locking structure according to this invention is as follows: 1. locking operation: the lower tubular part of the telescopic tube is rotated in one direction, which drives the eccentric camshaft to rotate along with the lower tubular part; as the central lines of the eccentric camshaft and the opening cam are not overlapped with the axis of the telescopic tube, the eccentric camshaft and the opening cam produce displacements outwards under the action of the centrifugal force at the moment, thereby tightly locking the upper and lower tubular parts of the telescopic tube; in order to prevent separation between the upper tubular part and the lower tubular part, the upper portion of the lock ring sheathed on the lower tubular part is connected with the upper tubular part; 2. releasing operation: the lower tubular part of the telescopic tube is rotated in the opposite direction, which drives the eccentric camshaft to rotate along with the lower tubular part; at the moment, the eccentric camshaft and the opening cam are reset inwards under the action of the centrifugal force, thereby releasing the upper and lower tubular parts of the telescopic tube; finally, the lock ring and the upper tubular part are unscrewed so that the upper and lower tubular parts can be separated.

Said embodiment is merely a preferred embodiment of the invention and is not used for limiting the implementation range of the invention. That is to say, all equivalent changes and modifications according to the contents within the patent scope of application by the invention belong to the technical category of the invention.

What is claimed is:

1. A telescopic tube locking structure comprising:
    a telescopic tube comprising at least an upper tubular part and a lower tubular part;
    an eccentric camshaft having a lower portion fixed in the lower tubular part and an upper portion being inserted into the upper tubular part;
    an opening cam having a larger diameter than the upper portion of the eccentric camshaft rotationally mounted on the eccentric camshaft and inserted in and engaged with the upper tubular part in a rotationally fixed manner such that the opening cam is axially movable along with the eccentric camshaft in the upper tubular part and is rotationally fixed with the upper tubular part; and
    a lock ring, wherein the upper portion of the lock ring is connected with the upper tubular part of the telescopic tube, the lower portion of the lock ring is gathered inwards to form a gathering part jointed with the external wall of the lower tubular part of the telescopic tube, and the external diameter of the upper portion of the eccentric camshaft is larger than that of the lower tubular part of the telescopic tube;
    wherein a central line of the opening cam is offset from a central line of the upper portion of the eccentric camshaft.

2. The telescopic tube locking structure according to claim 1, wherein
    the eccentric camshaft is provided with a cylindrical body, the upper portion of the cylindrical body is sunken inwards to form a cylindrical neck, and a central line of the cylindrical neck is offset from the central line of the cylindrical body; and
    the opening cam is provided with a hollow cylindrical body having thereon a notch for matching with the neck of the eccentric camshaft whereby the opening cam is buckled with the eccentric camshaft, a clamping groove is formed on the external wall of the opening cam for matching with at least one convex rib arranged on the internal wall of the upper tubular part of the telescopic tube for preventing the opening camshaft from rotating axially.

3. The telescopic tube locking structure of claim 1, wherein the upper portion of the lock ring and the upper tubular part of the telescopic tube are in threaded connection.

4. The telescopic tube locking structure of claim 1 further comprising a barrier sheet installed in the upper tubular part of the telescopic tube, wherein the barrier sheet comprises two opposite half-round sheet bodies, the lower portion of each half-round sheet body is extended outwards to form a convex edge, the external wall of the upper portion of each half-round sheet body is jointed with the internal wall of the upper tubular part of the telescopic tube, the internal wall of each half-round sheet body is jointed with the external wall of the lower tubular part of the telescopic tube, and the upper end face of the convex edge is jointed with the lower end face of the upper tubular part.

5. A telescopic tube locking structure comprising:
    a telescopic tube comprising at least an upper tubular part and a lower tubular part;
    an eccentric camshaft having a lower portion fixed in the lower tubular part and an upper portion being inserted into the upper tubular part;
    an opening cam having a larger diameter than the upper portion of the eccentric camshaft rotationally mounted on the eccentric camshaft and inserted in and engaged with the upper tubular part in a rotationally fixed manner such that the opening cam is axially movable along with the eccentric camshaft in the upper tubular part and is rotationally fixed with the upper tubular part; and
    a lock ring between the upper and lower tubular parts;
    wherein the external diameter of the upper portion of the eccentric camshaft is larger than that of the lower tubular part of the telescopic tube; and wherein a central line of the opening cam is offset from a central line of the upper portion of the eccentric camshaft.

6. The telescopic tube locking structure according to claim 5, wherein
the eccentric camshaft is provided with a cylindrical body, the upper portion of the cylindrical body is sunken inwards to form a cylindrical neck, and a central line of the cylindrical neck is offset from the central line of the cylindrical body.

7. The telescopic tube locking structure according to claim 5, wherein
the opening cam is provided with a hollow cylindrical body having thereon a notch for matching with the neck of the eccentric camshaft whereby the opening cam is buckled with the eccentric camshaft, a clamping groove is formed on the external wall of the opening cam for matching with at least one convex rib arranged on the internal wall of the upper tubular part of the telescopic tube for preventing the opening camshaft from rotating axially.

8. The telescopic tube locking structure of claim 5, wherein an upper portion of the lock ring is connected with the upper tubular part of the telescopic tube, and a lower portion of the lock ring is gathered inwards to form a gathering part jointed with the external wall of the lower tubular part of the telescopic tube.

9. The telescopic tube locking structure of claim 5, wherein an upper portion of the lock ring and the upper tubular part of the telescopic tube are in threaded connection.

10. The telescopic tube locking structure of claim 5 further comprising a barrier sheet installed in the upper tubular part of the telescopic tube.

11. The telescopic tube locking structure of claim 10, wherein
the barrier sheet comprises two opposite half-round sheet bodies, the lower portion of each half-round sheet body is extended outwards to form a convex edge, the external wall of the upper portion of each half-round sheet body is jointed with the internal wall of the upper tubular part of the telescopic tube, the internal wall of each half-round sheet body is jointed with the external wall of the lower tubular part of the telescopic tube, and the upper end face of the convex edge is jointed with the lower end face of the upper tubular part.

12. A telescopic tube locking structure comprising:
a telescopic tube comprising at least an upper tubular part and a lower tubular part;
an eccentric camshaft having a lower portion fixed in the lower tubular part and an upper portion being inserted into the upper tubular part;
an opening cam having a larger diameter than the upper portion of the eccentric camshaft rotationally mounted on the eccentric camshaft and inserted in and engaged with the upper tubular part in a rotationally fixed manner such that the opening cam is axially movable along with the eccentric camshaft in the upper tubular part and is rotationally fixed with the upper tubular part; and
a lock ring between the upper and lower tubular parts, wherein an upper portion of the lock ring and the upper tubular part of the telescopic tube are in threaded connection;
wherein a central line of the opening cam is offset from a central line of the upper portion of the eccentric camshaft.

13. The telescopic tube locking structure according to claim 12, wherein
the eccentric camshaft is provided with a cylindrical body, the upper portion of the cylindrical body is sunken inwards to form a cylindrical neck, and a central line of the cylindrical neck is offset from the central line of the cylindrical body.

14. The telescopic tube locking structure according to claim 12, wherein
the opening cam is provided with a hollow cylindrical body having thereon a notch for matching with the neck of the eccentric camshaft whereby the opening cam is buckled with the eccentric camshaft, a clamping groove is formed on the external wall of the opening cam for matching with at least one convex rib arranged on the internal wall of the upper tubular part of the telescopic tube for preventing the opening camshaft from rotating axially.

15. The telescopic tube locking structure of claim 12, wherein
the upper portion of the lock ring is connected with the upper tubular part of the telescopic tube, and a lower portion of the lock ring is gathered inwards to form a gathering part jointed with the external wall of the lower tubular part of the telescopic tube.

16. The telescopic tube locking structure of claim 12 further comprising a barrier sheet installed in the upper tubular part of the telescopic tube.

17. The telescopic tube locking structure of claim 16, wherein
the barrier sheet comprises two opposite half-round sheet bodies, the lower portion of each half-round sheet body is extended outwards to form a convex edge, the external wall of the upper portion of each half-round sheet body is jointed with the internal wall of the upper tubular part of the telescopic tube, the internal wall of each half-round sheet body is jointed with the external wall of the lower tubular part of the telescopic tube, and the upper end face of the convex edge is jointed with the lower end face of the upper tubular part.

* * * * *